United States Patent [19]

Yamamoto et al.

[11] Patent Number: 5,132,104
[45] Date of Patent: Jul. 21, 1992

[54] NEEDLE SHAPED MONOAMINE COMPLEX OF ZINC CARBONATE AND PROCESS FOR PRODUCING IT

[75] Inventors: Nobuyuki Yamamoto; Masahiro Nemoto, both of Tokyo; Fumitomo Noritake, Yokohama; Junko Tomita, Tachikawa; Noriyuki Ban, Kawasaki, all of Japan

[73] Assignee: Lion Corporation, Tokyo, Japan

[21] Appl. No.: 555,623

[22] Filed: Jul. 23, 1990

[30] Foreign Application Priority Data

Jul. 21, 1989 [JP] Japan .................................. 1-196114
Oct. 31, 1989 [JP] Japan .................................. 1-225633
Dec. 17, 1989 [JP] Japan .................................. 10318500

[51] Int. Cl.$^5$ .......................... C01B 31/24; C01G 9/02
[52] U.S. Cl. ................................ 423/419 P; 106/419; 106/425; 423/419 R; 423/266; 423/622; 252/518
[58] Field of Search .................. 423/419 R, 622, 623, 423/419 P, 266; 106/419, 425; 210/199, 202; 252/518

[56] References Cited

U.S. PATENT DOCUMENTS 4,282,117  8/1981  Muramoto et al. .................. 252/508
4,710,215 12/1987  Kasai et al. ........................... 423/105
4,894,185  1/1990  Djega-Mariadassou et al. ... 252/519

FOREIGN PATENT DOCUMENTS 50-6597   1/1975  Japan .
56-120518 9/1981  Japan .
57-205320 12/1982 Japan .
1212209A  8/1989  Japan .............................. 423/419 R
7500928   7/1975  Netherlands ....................... 423/419
704900    3/1977  U.S.S.R. ........................... 423/419 R

OTHER PUBLICATIONS

"Vapor Growth of ZnO Needle Crystals" by Kohei Kodaira et al., Chemistry Letters, pp. 589–590, 1975.
"Shape And Structure Of Zinc Oxide Particles Prepared By Vapor-Phase Oxidation Of Zinc Vapor" by Yoko Suyama et al., Journal of the American Ceramic Society, vol. 71, No. 5, pp. 391–395, May 1988.

Primary Examiner—Gary P. Straub
Assistant Examiner—Stephen G. Kalinchak
Attorney, Agent, or Firm—Burns, Doane, Swecker & Mathis

[57] ABSTRACT

A needle-like monoammine complex of zinc carbonate containing or not containing aluminum useful as a filler or a precursor of needle-like electroconductive zinc oxide, and a process for producing it which comprises steps of dissolving a zinc compound in a solution containing ammonium ion and carbonate ion in the presence or absence of aluminum compound and then lowering pH of the solution to precipitate zinc carbonate.

14 Claims, 2 Drawing Sheets

1

NEEDLE SHAPED MONOAMINE COMPLEX OF ZINC CARBONATE AND PROCESS FOR PRODUCING IT

BACKGROUND OF THE INVENTION

The present invention relates to needle-like zinc carbonate useful as a filler or a precursor of needle-like zinc oxide, process for producing it and an electroconductive powder produced by firing zinc carbonate.

Processes for producing needle-like zinc oxide, among needle-like zinc compounds, are well-known as described in, for example, Japanese Patent Unexamined Published Application (hereinafter referred to as 'J.P. KOKAI') Nos. 50-6597, 56-120518 and 57-205320. However, they have problems in that they necessitate a complicated apparatus and that the product has only a low concentration.

Further, although zinc carbonate can be converted into zinc oxide by firing, no process for producing neddle-like zinc carbonate has heretofore been known.

On the other hand, processes for producing unshaped zinc carbonate have already been known. For example, J.P. KOKAI No. 60-200826 discloses a process for producing basic zinc carbonate by bubbling carbon dioxide or a carbon dioxide-containing substance into an aqueous slurry of zinc oxide. However, the needle-like product cannot be obtained by this process.

No process has been known for producing needle-like zinc carbonate containing aluminum as the dopant.

On the other hand, a white or whitish electroconductive filler for resins and paints capable of coloring them as desired has been demanded. Various investigations has been made for the purpose of satisfying such a demand. Electroconductive zinc oxide containing a doping agent such as Al, Ga or Ge was proposed since zinc oxide is essentially a white semi-conductor. In particular, those containing Al, Ga or In as the doping agent (U.S. Pat. No. 3,538,022), those containing Ge or Sn (U.S. Pat. No. 3,538,023), those containing Al (J.P. KOKAI No. 54-161598) and those containing Al, Ti or Sn (J.P. KOKAI No. 58-161923) were proposed. Although there are thus known the processes for reducing the volume resistivity of ZnO by adding Al, Ga, Sn, Ge or In thereto, the products obtained by these process are in the form of a globular or unshaped powder and, therefore, a large amount thereof is necessitated for imparting electroconductivity to resins.

Further although processes for producing needle-like or platy ZnO are known, the product does not contain any doping agent such as Al and are used for purposes different from the imparting of electroconductivity.

The processes for producing platy ZnO include a process disclosed in J.P. KOKAI No. 53-83996 and processes for producing needle-like ZnO include those described above.

SUMMARY OF THE INVENTION

The primary object of the present invention is, therefore, to provide needle-like zinc carbonate useful as a precursor of needle-like zinc oxide.

The second object of the present invention is to provide needle-like zinc carbonate useful as a precursor of aluminum-containing needle-like zinc oxide.

The third object of the present invention is to provide a process for efficiently producing the above-described needle-like zinc carbonate.

Still another object of the present invention is to provide a needle-like or platy electroconductive powder capable of imparting effective conductivity to resins and paints even though it is used in a small amount.

These and other objects of the present invention will be clear from the following description and Examples.

The first aspect of the present invention has been completed on the basis of a finding that the needle-like product can be obtained when a solution containing zinc ion, ammonium ion and carbonate ion (or hydrogencarbonate ion) in a specified ratio is prepared and then pH of the solution is adjusted to a specified range to precipitate zinc carbonate.

Namely, the present invention provides needle-like zinc carbonate having an average length of 10 to 100 $\mu$m, average thickness of 0.5 to 10 $\mu$m and aspect ratio of at least 3.

The present invention also provides a process for producing needle-like zinc carbonate comprising steps of dissolving a zinc compound in a solution containing 3 to 7 mol of ammonium ion and 0.5 to 4 mol of carbonate ion and/or hydrogencarbonate ion per mol of zinc atom and adjusting pH of the solution at 7~9.5 to precipitate zinc carbonate.

The second aspect of the present invention has been completed on the basis of a finding that the needle-like product containing aluminum can be obtained when a solution containing zinc ion, ammonium ion and carbonate ion (or hydrogencarbonate ion) in a specified ratio is prepared and then specified amounts of an aluminum compound and an acidic substance are added thereto to precipitate zinc carbonate.

Namely, the present invention provides needle-like zinc carbonate containing 0.0001 to 0.1 mol of aluminum atom per mol of zinc atom and having a length of 5 to 100 $\mu$m, thickness of 0.05 to 6 $\mu$m and aspect ratio of at least 10.

The third aspect of the present invention has been completed on the basis of a finding that the above-described object can be effectively attained when platy zinc oxide in the form of needle-like or platy crystals having a ratio of the length/thickenss in a specified range is doped with a specific metal.

Namely, the present invention provides an electroconductive zinc oxide powder containing 0.0001 to 0.1 mol of a trivalent and/or tetravalent metal atom per mol of Zn atom and having a volume resistivity of not higher than $10^5$ $\Omega$cm which powder comprises needle-like particles having an aspect ratio of 3 to 400 or a platy particles having a ratio of the length/thickenss of 10 to 1,000.

DESCRIPTION OF THE PREFERRED EMBODIMENTS

Figure 1:
FIGS. 1 and 2 are electron photomicrographs ($\times$500 magnification) showing the needle-like zinc carbonate of the present invention.

In the first aspect of the invention, ammonium ion sources in the aqueous solution in which the zinc compound is to be dissolved include gaseous ammonia, ammonium hydroxide, carbamic acid and various water-soluble ammonium salts. The carbonate ion sources and hydrogencarbonate ion sources include carbon dioxide, water-soluble carbonates and hydrogencarbonates. In the present invention, the molar ratio of ammonium ion to carbonate ion (and/or hydrogencarbonate ion) in the solution is particularly adjusted to:

[NH$_4$]/[Zn] = in the range of 3 to 7, preferably 3.5 to 6.5

[CO$_3$]/[Zn] = in the range of 0.5 to 4, preferably 0.8 to 3.5.

In the above formula, also hydrogencarbonate ion is represented as CO$_3$ for convenience' sake (the same shall apply hereinafter).

The Zn ion concentration in the solution is not particularly limited so far as Zn is dissolved therein. However, it is preferably 0.1 to 3 mol/l, particularly 0.5 to 2 mol/l. When Zn concentration is higher than 3 mol/l, the Zn compound is not easily soluble therein and the particles thereof get out of needle-like shape or are inclined to aggregate when pH is lowered. When, on the contrary, the concentration is insufficient, the yield is low and the efficiency is also low.

When [NH$_4$]/[Zn] in the present invention is lower than the above-described range, the solubility of the zinc compound is extremely reduced and, on the contrary, when it exceeds that range, the crystals having the intended needle-like shape cannot be formed even if pH is lowered in order to precipitate the crystals, though the solubility of the zinc compound is increased. A lower [NH$_4$]/[Zn] is preferred for obtaining the needle-like particles having a high aspect ratio. When [CO$_3$]/[Zn] is lower than or higher than the above-described range, the solubility of the zinc compound is extremely lowered.

The preferred molar ratio of [NH$_4$]/[CO$_3$] in the present invention is in the range of 1.5 of 4.2, particularly 1.8 to 4.0.

The solution having the above-described composition is prepared usually from ammonium carbonate, ammonium hydrogencarbonate, basic zinc carbonate, aqueous ammonia, gaseous ammonia, carbon dioxide, ammonium carbamate, etc. Among them, ammonium carbonate or ammonium hydrogencarbonate alone or a combination thereof with ammonia is particularly preferred.

The solution may further contain monovalent, bivalent, trivalent and tetravalent cations such as Na, K, Mg, Ca, Al, Ga, In, Ge and Sn as well as anions such as Cl, NO$_3$ and SO$_4$.

The zinc compounds to be dissolved in the solution is one or a mixture of two or more of zinc oxide, zinc hydroxide, zinc carbonate, basic zinc carbonate, basic zinc chloride, basic zinc sulfate, basic zinc nitrate, metallic zinc, etc. Among them, zinc oxide is preferred, since it has a high solubility.

In the present invention, the zinc compound can be dissolved by adding it to an aqueous solution containing given amounts of ammonium ion and carbonate ion and stirring them or, alternatively, by dispersing it in an aqueous solution containing ammonium ion and/or carbonate ion and then introducing gaseous ammonia or carbon dioxide to form a solution. It is desirable that the pH of the solution in the dissolving step is 8.5 to 12.0, preferably 8.5 to 11.0. The higher the ratio of [NH$_4$]/[CO$_3$], the higher pH.

In case a water-insoluble matter is formed when the zinc compound is dissolved by the above-described process, it is removed by an ordinary method. Then the pH of the solution is lowered to 7 to 9.5, preferably 8 to 9.2 to form needle-like zinc carbonate. The pH can be lowered by, for example, introducing carbon dioxide thereinto or adding a mineral acid such as hydrochloric acid, sulfuric acid or nitric acid, or an organic acid such as acetic acid, formic acid or oxalic acid thereto. When the pH is lowered to 10.0~8.0, the precipitate begins to be formed, so that the final pH should be adjusted 9.5~7.0. The lower the pH, the higher the yield. However, when pH is too low or when the introduction of carbon dioxide is continued too long, the resulting needle-like crystals have a low aspect ratio.

Although the reaction temperature is not particularly limited, it is preferably around room temperature, since ammonium ion and carbonate ion in the solution are released in the form of ammonia and carbon dioxide, respectively, at 60° C. or higher.

The precipitate thus formed is taken by filtration and dried to remove water. After the filtration, the precipitate is desirably not washed with water, since when it is washed, the needle-like shape of it might be broken. It is preferred to wash the precipitate with a water soluble solvent such as methanol, ethanol or acetone, since the needle-like particles can be rapidly dried thereafter without disintegration of them and degree of the aggregation of the particles is reduced. The drying is conducted at room temperature to lower than 200° C., preferably 150° C. or lower, under atmospheric pressure or reduced pressure.

The needle-like zinc carbonate obtained by the process of the present invention is considered to be monoammine complex of zinc carbonate which is ZnCO$_3$·NH$_3$. It may contain impurities or monovalent to tetravalent cations such as Na, K, Mg, Ca, Al, Ga, In, Ge and Sn as well as anions such as Cl$^-$, NO$_3^-$, SO$_4^{2-}$, CH$_3$COO$^-$, HCOO$^-$ and (COO)$_2^{-2}$ added thereto in the step of synthesis thereof. Particularly when the product is used as the electroconductive zinc oxide, it preferably contains 0.0001 to 0.1 mol of a trivalent or tetravalent metal such as Al, Ga, In, Ge or Sn per mol of zinc atom.

According to the present invention, needle-like zinc carbonate having a length of 10 to 100 μm, thickness of 0.5 to 10 μm and aspect ratio of at least 3, preferably 5 to 100 is produced. When needle-like zinc carbonate thus produced is calcined at 300° to 400° C. or above, it is converted into zinc oxide while the needle-like shape thereof is kept.

In the present invention, it is considered that the zinc compound is dissolved in the form of tetraammine complex of zinc carbonate or zinc hydrogencarbonate and then pH is lowered to precipitate it in the form of monoammine complex of zinc carbonate. However, the mechanism of the formation of the needle-like particles has not been elucidated.

According to the present invention, needle-like zinc carbonate having an aspect ratio of at least 3 can be easily produced.

Therefore, an advantage of the present invention is that the reinforcing effect of zinc carbonate usually in unshaped form and used as a filler or vulcanization-accelerator for paints and rubbers can be improved by converting it into the needle-like form. The needle-like zinc carbonate is easily converted into needle-like zinc oxide by firing. This product is also usable as the filler. In addition, when it is doped with a trivalent or tetravalent metal such as Al, needle-like electroconductive zinc oxide can be obtained. Thus needle-like zinc carbonate is useful as the precursor.

In the second aspect of the present invention, Al ion is employed from among the trivalent cations used as the coexistent ion in the first aspect of the invention. The needle-like zinc carbonate containing aluminum according to the second aspect of the present invention is preferably produced by a process comprising the steps of dissolving the zinc compound and then adding an acid or carbon dioxide and an aluminum compound containing 0.0001 to 0.1 mol of aluminum atom per mol of zinc atom to the solution containing 3 to 10 mol of ammonium ion per mol of zinc atom and carbonate ion and/or hydrogencarbonate ion to precipitate zinc carbonate containing aluminum.

In particular, the following carbon dioxide introduction method or acid dropping method is preferred.

CARBON DIOXIDE INTRODUCTION METHOD

Preferred carbon dioxide introduction methods are (1) a method wherein an aqueous solution containing the above-described amounts of the zinc compound, ammonium ion, carbonate ion and/or hydrogencarbonate ion is prepared and then an aqueous aluminum compound solution and carbon dioxide are simultaneously added thereto and (2) a method wherein an aqueous solution containing the above-described amounts of the zinc compound, ammonium ion, carbonate ion and/or hydrogencarbonate ion and aluminum ion is prepared and then carbon dioxide is introduced thereinto.

The ammonium ion source in the aqueous solution in which the zinc compound is to be dissolved, proportion of ammonium ion to carbonate ion and/or hydrogencarbonate ion in the solution, Zn ion concentration, molar ratio of $[NH_4]/[CO_3]$, zinc compound and pH of the solution in the step of dissolving the zinc compound are the same as those described in the first aspect of the present invention.

The amount of Al to be added is preferably 0.0001 to 0.1 mol, more preferably 0.001 to 0.05 mol, per mol of Zn atom.

In particular, when Al is added in an amount within the above-described range (particularly when the needle-like crystals are formed in the presence of Al ion), the aspect ratio of the needle-like crystals is increased.

Namely, under these conditions, more than 80% of particles of needle-like zinc carbonate having a length of 5 to 100 $\mu$m, thickness of 0.05 to 6 $\mu$m and aspect ratio of at least 10 are formed. Further under suitably selected conditions, more than 50% of the particles having a length of 20 to 80 $\mu$m, thickness of 0.05 to 2 $\mu$m and aspect ratio of as high as at least 30 are formed. The balance comprises needle-like zinc carbonate having a length of 5 to 100 $\mu$m, thickness of 6 to 10 $\mu$m and aspect ratio of at least 3. These particles of needle-like zinc carbonate contain 0.0001 to 0.1 mol of Al atom per mol of Zn atom.

When the particles contain Al, the aspect ratio is not easily reduced and the yield is increased, while the aspect ratio of the Al-free particles was reduced when the $CO_2$ introduction time is prolonged or the final pH is lowered. Therefore, the final pH is preferably 8.0 to 9.5. By the addition of Al, the particles having a high aspect ratio can be stably obtained.

The aluminum compound can be dissolved or dispersed in a solution of the zinc compound in a solution containing ammonium ion and carbonate ion (or hydrogencarbonate ion). Although the aluminum compound is not particularly limited, it is preferably ammonium alum, potassium alum, aluminum sulfate, aluminum nitrate, aluminum chloride, aluminum acetate, aluminum oxalate or aluminum formate.

The above-described methods (1) and (2) are preferred, since aluminum can be present in the solution before zinc carbonate starts to precipitate, thereby increasing the relative amount of the thin needle-like particles.

ACID DROPPING METHOD

Preferred acid dropping methods are (1) a method wherein an aqueous solution containing the above-described amounts of the zinc compound, ammonium ion, carbonate ion and/or hydrogencarbonate ion is prepared and then an aqueous aluminum compound solution and an acid are simultaneously added thereto, (2) a method wherein an aqueous solution containing the above-described amounts of the zinc compound, ammonium ion, carbonate ion and/or hydrogencarbonate ion is prepared and then an acidic aqueous aluminum compound solution is added thereto and (3) a method wherein an aqueous solution containing the above-described amounts of the zinc compound, ammonium ion, carbonate ion and/or hydrogencarbonate ion and aluminum is prepared and then an acid is added dropwise thereto. In the acid dropping methods, the molar ratio of ammonium ion to carbonate ion (and/or hydrogencarbonate ion) in the solution is particularly adjusted to:

$[NH_4]/[Zn]$ = in the range of 4 to 10, preferably 4.2 to 8

$[CO_3]/[Zn]$ = in the range of 1 to 7, preferably 2 to 5.

The molar ratio $[NH_4]/[CO_3]$ is preferably in the range of 1.5 to 3, particularly 1.8 to 2.5.

An acid is added dropwise to the solution thus prepared to adjust the final pH preferably in the range of 6 to 9.5, particularly 6.5 to 8.5.

The conditions other than those described above in the acid dropping method may be the same as those in the carbon dioxide introduction method.

The acids, reaction temperature and method of recovering the formed precipitate in the method of the second aspect may be the same as those in the first aspect of the invention.

The needle-like zinc carbonate produced by the process of the present invention is considered to be aluminum atom-containing monoammine complex of zinc carbonate in a similar manner as in the first aspect of the present invention. It may contain impurities or monovalent to tetravalent cations such as Na, K, Mg, Ca, Ga, In, Ge and Sn as well as anions such as $Cl^-$, $NO_3^-$, $SO_4^{2-}$, $CH_3COO^-$, $HCOO^-$ and $(COO)_2^{2-}$ added thereto in the steps of synthesis thereof.

According to the present invention of the second aspect, needle-like zinc carbonate having a length of 5 to 100 $\mu$m, preferably 20 to 80 $\mu$m, thickness of 0.05 to 6 $\mu$m, preferably 0.05 to 2 $\mu$m and aspect ratio of at least 10, preferably 30 to 200, is produced. When needle-like zinc carbonate thus produced is fired at 300° to 400° C. or above, it is converted into zinc oxide while the needle-like shape thereof is maintained.

In the third aspect of the present invention, the shape of the particles of the electroconductive zinc oxide powder is an important factor. The electroconductive power is produced by calcining the needle-like zinc carbonate produced in the presence of the trivalent and/or tetravalent metal atom in the first aspect of the present invention or the needle-like zinc carbonate produced in the second aspect of the invention. The electroconductive zinc oxide powder can be produced also by doping (1) the needle-like zinc carbonate produced in the absence of the trivalent and/or tetravalent metal atom in the first aspect of the present invention, (2) needle-like zinc oxide prepared by firing the needle-like zinc carbonate set out in item (1), (3) needle-like zinc oxide produced by a process disclosed in J.P. KOKAI No. 57-205320 or 56-120518 or (4) platy zinc oxide produced by heating platy zinc hydroxide produced by a process disclosed in J.P. KOKAI No. 53-83996 with a trivalent or tetravalent metal. In particular, it can be produced by mixing needle-like or platy zinc oxide or its precursor with an oxide or salt of a trivalent or tetravalent metal such as Al, Ge, Ga, Sn or In as the doping agent and then firing the mixture in a non-oxidizing atmosphere, preferably in a reducing atmosphere. It is also possible that the needle-like or platy zinc oxide is produced in the presence of the doping agent to obtain the doping agent-containing needle-like or platy zinc oxide.

The zinc oxide precursors include mineral acid salts of zinc such as zinc hydroxide, zinc carbonate, zinc carbonate, basic zinc chloride, basic zinc nitrate, basic zinc sulfate, basic zinc carbonate, zinc chloride, zinc nitrate and zinc sulfate as well as organic acid salts thereof such as zinc acetate, zinc oxalate and zinc formate.

The doping agents include metal salts such as metal chlorides, nitrates, sulfates, carbonates, acetates, formates and oxalates, metal oxides and metals per se.

Zinc oxide or its precursor can be mixed with the doping agent by a dry method or by a wet method wherein a dispersion or solution of the doping agent is used.

An eroding agent as described in J.P. KOKAI No. 58-161923 can be used for effectively conducting the doping agent. In this case, the treatment temperature and time are preferably controlled to 70° C. or below and 1 h or less, respectively, so that the needle-like or platy shape to the powder particles can be kept during the reaction.

It is desirable that the firing is conducted at 500° to 1300° C., preferably 700° to 900° C., in a non-oxidizing gas ($N_2$ gas or, argon gas), preferably in a reducing atmosphere ($N_2$ or argon gas containing CO or $H_2$). The heating can be conducted also in the presence of solid carbon as disclosed in J.P. KOKAI No. 54-161598. This firing condition can be also applied to the case where the second aspect of the invention is fired to form the needle-like zinc oxide.

Thus the electroconductive zinc oxide powder comprising amorphous or hexagonal crystals are produced by the above-described process in the third aspect of the invention. The term 'needle-like particles' also includes rod-like, fibrous, tetrapod-like particles and whiskers. The aspect ratio of the needle-like crystals used in the third aspect of the present invention is in the range of 3 to 400, preferably 6 to 100. When the aspect ratio is too low, the effect of the shape cannot be obtained and, on the contrary, when it is too high, the particles are easily broken to exert a bad influence on the properties of the resin and the coating film. The length of the needle-like crystals is preferably 2 to 200 $\mu$m, more preferably 3 to 50 $\mu$m and the thickness thereof is preferably 0.05 to 10 $\mu$m, more preferably 0.1 to 5$\mu$.

The tetrapod-shaped particles are produced when the needle-like crystals grow from the center of each tetrahedron toward the vertexes thereof. It is preferred that each of the four pods thereof has the same aspect ratio and length as those of the above-described needle-like particles.

The term 'platy particles' herein includes also flat particles and tabular particles.

Although the shape of the plates is not particularly limited, the ratio of the length to thickness thereof is 10 to 1000, preferably 15 to 200. The length (longest length of a particle) of the platy particles is preferably 1 to 200 $\mu$m, more preferably 2 to 100 $\mu$m and the thickness thereof is preferably 0.01 to 10 $\mu$m, more preferably 0.1 to 5 $\mu$m.

To effectively impart the electroconductivity to the resin or coating film with the a small amount of the powder of the present invention, it is preferred that the particles of the powder have a specific surface area (determined by BET method) of at least 1 $m^2/g$ and an oil absorption (JIS K5101) of at least 10 ml/100 g. The higher these values, the better.

It is important in the present invention that the electroconductive powder has a volume resistivity of not higher than $10^5$ $\Omega$cm, preferably not higher than $10^4$ $\Omega$cm and more preferably in the range of $10^4$ to 1. If the powder has higher volume resistivity than the above-described value, it cannot impart the effective electroconductivity to the resin or coating film. The volume resistivity can be determined by, for example, placing 1 g of the sample in a resin cylinder having an inner diameter of 10 mm, applying a pressure of 100 kg/cm$^2$ thereto, measuring the resistance with a tester and calculating the value according to the following formula:

$$\text{Volume resistivity } (\Omega \text{ cm}) = \frac{\text{Total resistance } (\Omega) \times \text{Inner area of cylinder (cm}^2)}{\text{Thickness of sample (cm)}}$$

To obtain the above-described volume resistivity, at least one of trivalent and/or tetravalent metals such as Al, Ga, Ge, Sn and In is incorporated therein in an amount of 0.0001 to 0.1 mol, preferably 0.001 to 0.05 mol, per mol of Zn atom. When the quantity of the doping metal(s) is insufficient, the volume resistivity is high and, on the contrary, when it is too large, the reducing of the volume resistivity is also impossible.

According to the third aspect of the present invention, an effective network is easily formed in the resin or coating film, since the particles are needle-like or platy ones. Thus, the electroconductive zinc oxide powder capable of imparting excellent electroconductivity with a small amount thereof is provided. Since the powder of the present invention is white or whitish, it can be incorporated into the resin together with a suitable colorant to color the resin an intended color.

Thus the electroconductive powder of the present invention is widely usable as a filler capable of imparting electroconductivity or electrostatic property to resins and paints. It is usable also as a coating agent in the production of recording papers for a facsimile by electrical discharge recording, electrostatic recording or electro-thermosensitive recording and other information-recording papers and industrial recording papers.

The following non-limitative Examples will further illustrate the present invention.

EXAMPLE 1

129.7 g (1.35 mol) of ammonium carbonate was dissolved in 600 ml of water. Then 48.8 g (0.6 mol) of zinc oxide (the French-process No. 1 zinc white produced by Sakai Chemical Industry Co., Ltd.) was dissolved in the solution. The resultant solution had an [$NH_4$]/[$Zn$] of 4.5, [$CO_3$]/[$Zn$] of 2.3 and pH of 9.1. When carbon dioxide was bubbled into the solution under stirring, the solution became milky at pH 8.7. The introduction of carbon dioxide was further continued and the reaction was terminated at pH 8.4. The precipitate thus formed was taken by filtration, washed with methanol and then dried in a dryer at 105° C. for 24 h.

The resultant powder comprised particles of needle-like monoammine complex of zinc carbonate having an average length of 35 μm, average thickness of 3.4 μm and aspect ratio of 10. The needle-like powder was calcined at 500° C. to form zinc oxide without breaking the needle-like shape thereof. Needle-like zinc oxide had an average length of 30 μm, average thickness of 2.1 μm and aspect ratio of 15.

EXAMPLE 2

57.6 g (0.6 mol) of ammonium carbonate was dissolved in 400 ml of water. Then 75 g (1.2 mol) of 28% aqueous ammonia was added thereto and 48.8 g (0.6 mol) of zinc oxide (the French-process No. 1 zinc white produced by Sakai Chemical Industry Co., Ltd.) was dissolved therein. The total quantity of the solution was adjusted to 600 ml. The solution had [$NH_4$]/[$Zn$] of 4, [$CO_3$]/[$Zn$] of 1 and pH of 10.3. When carbon dioxide was bubbled into the solution under stirring, the solution became milky at pH 8.7. The introduction of carbon dioxide was further continued and the reaction was terminated at pH 8.5. The precipitate thus formed was taken by filtration, washed with methanol and then dried in a dryer at 50° C. for 24 h. The resultant powder comprised particles of needle-like monoammine complex of zinc carbonate having an average length of 30 μm, average thickness of 2.5 μm and aspect ratio of 12.

EXAMPLE 3

106.8 g (1.35 mol) of ammonium hydrogencarbonate was dissolved in 400 ml of water. Then 48.8 g (0.6 mol) of zinc oxide (the French-process No. 1 zinc white produced by Sakai Chemical Industry Co., Ltd.) was dispersed therein and then 65 g (1.1 mol) of 28% aqueous ammonia was added thereto to thoroughly dissolve zinc oxide. The solution had [$NH_4$]/[$Zn$] of 4.1, [$CO_3$]/[$Zn$] of 2.3 and pH of 10.2. When carbon dioxide was bubbled into the solution under stirring, a white crystal was started to be formed at pH 9.7. The introduction of carbon dioxide was terminated at pH 9.0. The precipitate was taken by filtration and then directly dried at 105° C. for 24 without washing. The resulting powder comprised particles of needle-like monoammine complex of zinc carbonate having an average length of 70 μm, average thickness of 4.8 μm and aspect ratio of 15.

EXAMPLE 4

108 g (1.1 mol) of ammonium carbonate was dissolved in 500 ml of water. 40.5 g (0.5 mol) of zinc oxide (the French-process No. 1 zinc white produced by Sakai Chemical Industry Co., Ltd.) was dissolved therein. The solution had [$NH_4$]/[$Zn$] of 4.4, [$CO_3$]/[$Zn$] of 2.2 and pH of 9.0. When 1N $H_2SO_4$ was added dropwise to the solution, the solution became milky at pH 8.8. The addition was terminated at pH 8.5. The precipitate was taken by filtration, washed with methanol and dried at 105° C. for 24 h. The resultant powder had an average length of 70 μm, average thickness of 3.5 μm and aspect ratio of 20.

EXAMPLE 5

24 g (0.3 mol) of zinc oxide (No. 1 zinc white produced by Sakai Chemical Industry Co., Ltd.) and 65 g (0.68 mol) of ammonium carbonate were dissolved in water to obtain 300 ml of the solution. The solution had [$NH_4$]/[$Zn$] of 4.5, [$CO_3$]/[$Zn$] of 2.3 and pH of 9.1.

Then a solution of 0.006 mol (in terms of Al atom) of a given Al salt was dissolved in a 1N aqueous solution shown in Table 1. 500 ml of the solution was slowly added dropwise to the zinc oxide solution produced as described above. As the solution was added, the reaction mixture became milky. The final pH was 8.3 to 8.6. The precipitate thus formed was taken by filtration, washed with methanol and dried at 105° C. overnight. Each powdery product thus obtained had an aspect ratio distribution. It comprised over eighty % of particles having a length of 5 to 100 μm, thickness of 0.05 to 6 μm and aspect ratio of at least 10. The relative amount of the particles having a high aspect ratio, i.e. length of 20 to 80 μm, thickness of 0.05 to 2 μm and aspect ratio of at least 30 is shown in Table 1.

The needle-like particles were calcined at 500° C. in air for 1 h and then fired at 800° C. for 1 h while $N_2$ gas containing $H_2$ gas was introduced thereinto. The needle-like particles were scarcely deformed and the resultant powder was electroconductive. The volume resistivity of the product is shown in Table 1.

TABLE 1

| No. | Acid added | Al salt | Proportion of particles having high aspect ratio* | Volume resistivity of powder (Ω cm) |
|---|---|---|---|---|
| 1 | $H_2SO_4$ | $Al_2SO_4$ | 60 | $3.3 \times 10^2$ |
| 2 | " | $NH_4Al(SO_4)_2$ | 75 | $6.5 \times 10^2$ |
| 3 | $HNO_3$ | $Al(NO_3)_3$ | 60 | $7.6 \times 10^2$ |
| 4 | " | $NH_4Al(SO_4)_2$ | 75 | $6.2 \times 10^2$ |
| 5 | HCl | $AlCl_3$ | 60 | $7.6 \times 10^2$ |
| 6 | " | $NH_4Al(SO_4)_2$ | 65 | $6.9 \times 10^2$ |
| 7 | $CH_3COOH$ | $AlCl_3$ | 75 | $7.4 \times 10^2$ |
| 8 | " | $NH_4Al(SO_4)_2$ | 75 | $7.7 \times 10^2$ |

*Proportion (quantity %) of the particles having a length of 20 to 80 μm, thickness of 0.05 to 2 μm and aspect ratio of at least 30 [the same shall apply hereinafter]

EXAMPLE 6

The same procedure as that of Example 5 was repeated except that 1N sulfuric acid was used as the acid, a given amount of ammonium alum was used as the aluminum salt and the amount of the acid added dropwise was altered. The resultant needle-like particles had an aspect ratio distribution. The powder comprised over eighty % of particles having a length of 5 to 100 μm, thickness of 0.05 to 6 μm and aspect ratio of at least 10. The relative amount of the particles having a length of 20 to 80 μm, thickness of 0.05 to 2 μm and aspect ratio of as high as at least 30 and the final pH are shown in Table 2.

As for the shape of the powder particles, the length thereof of powder No. 9 prepared with a smaller amount of acid than that of powder No. 2 was a little shorter, but no significant difference was recognized in the aspect ratio. No significant difference in the length and aspect ratio was recognized between No. 10 wherein a large amount of the acid was used and No. 2.

The dried powder was fired at 800° C. for 1 h while N₂ gas containing CO gas was introduced thereinto to form electroconductive zinc oxide.

TABLE 2

| No. | Amount of sulfuric acid added | Amount of Al atom (per mol of Zn atom) | Final pH | Relative amount of particles of high aspect ratio (%) |
| --- | --- | --- | --- | --- |
| 9 | 200 ml (0.1 mol) | 0.008 mol | 8.7 | 70 |
| 10 | 1000 ml (0.5 mol) | 0.04 mol | 6.9 | 70 |

EXAMPLE 7

The same procedure as that of Example 5 was repeated except that 1N nitric acid was used as the acid, aluminum nitrate was used as the aluminum salt and the amount of the aluminum salt added was altered.

The resultant needle-like particles of the powder had an aspect ratio distribution. It comprised over eighty % of the particles having a length of 5 to 100 μm, thickness of 0.05 to 6 μm and aspect ratio of at least 10. The relative amount of the particles having a length of 20 to 80 μm, thickness of 0.05 to 2 μm and aspect ratio of as high as at least 30 is shown in Table 3.

The smaller the amount of Al, the less the number of the particles of high aspect ratio. The larger the amount of Al, the larger the number of the particles of high aspect ratio. In the latter case, unshaped particles were partially recognized.

When the powder thus obtained was calcined at 500° C. in air for 1 h, zinc oxide could be obtained without changing the shape of the particles.

TABLE 3

| No. | Amount of Al atom (mol per mol of Zn atom) | Relative amount of particles having high aspect ratio (%) |
| --- | --- | --- |
| 11 | 0.005 | 50 |
| 12 | 0.02 | 65 |
| 13 | 0.05 | 75 |
| 14 | 0.10 | 75 |

EXAMPLE 8

24 g (0.3 mol) of zinc oxide (No. 1 zinc white produced by Sakai Chemical Industry Co., Ltd.), 71 g (0.9 mol) of ammonium hydrogencarbonate and 53 g (0.9 mol) of 29% aqueous ammonia were dissolved in water to obtain 300 ml of the solution. It had [NH₄]/[Zn] of 6.0, [CO₃]/[Zn] of 3.0 and pH of 9.1. 800 ml of 1N sulfuric acid in which 4.1 g (0.009 mol) of ammonium alum 12-hydrate had been dissolved was added to the solution to form a precipitate. The final pH was 7.8.

The precipitate thus formed was taken by filtration, washed with methanol and dried at 105° C. overnight. The resultant powder had an aspect ratio distribution. It comprised over eighty % of particles having a length of 5 to 100 μm, thickness of 0.05 to 6 μm and aspect ratio of at least 10. The quantity of the particles having a length of 20 to 80 μm, thickness of 0.05 to 2 μm and aspect ratio of as high as at least 30 was 70%. The needle-like particles were fired at 800° C. for 1 h while N₂ gas containing CO was introduced thereinto to form electroconductive zinc oxide while keeping the shape of the particles.

EXAMPLE 9

41 g (0.5 mol) of zinc oxide (No. 1 zinc white produced by Sakai Chemical Industry Co., Ltd.) and 108 g (1.1 mol) of ammonium carbonate were dissolved in water to obtain 500 ml of the solution. It had [NH₄]/[Zn] of 4.4, [CO₃]/[Zn] of 2.2 and pH of 9.2. A solution of 4.5 g (0.01 mol) of ammonium alum 12-hydrate in 50 ml of water was slowly added dropwise to the solution while carbon dioxide was bubbled thereinto. The introduction of carbon dioxide was terminated when pH was lowered to 8.5 and a precipitate thus formed was taken by filtration. It was washed with methanol and dried at 105° C. overnight. The resultant powder had an aspect ratio distribution. It comprised over eighty % of the particles having a length of 5 to 100 μm, thickness of 0.05 to 6 μm and aspect ratio of at least 10. The amount of the particles having a length of 20 to 80 μm, thickness of 0.05 to 2 μm and aspect ratio of as high as at least 30 was 70%. The needle-like particles were fired at 800° C. for 1 h while N₂ gas containing CO was introduced thereinto to form electroconductive zinc oxide having a volume resistivity of $4.5 \times 10^2$ Ωcm while keeping the shape of the particles.

EXAMPLE 10

41 g (0.5 mol) of zinc oxide (No. 1 zinc white produced by Sakai Chemical Industry Co., Ltd.), 4.5 g (0.01 mol) of ammonium alum 12-hydrate and 108 g (1.1 mol) of ammonium carbonate were dissolved in water to form 700 ml of the solution. It had [NH₄]/[Zn] of 4.4, [CO₃]/[Zn] of 2.2 and pH of 9.2. Carbon dioxide was bubbled into the solution to lower pH thereof to 8.3. The precipitate thus formed was taken by filtration and then dried at 105° C. overnight without washing. The resultant powder had an aspect ratio distribution. It comprised over eighty % of the particles having a length of 5 to 100 μm, thickness of 0.05 to 6 μm and aspect ratio of at least 10. The quantity of the particles having a length of 20 to 80 μm, thickness of 0.05 to 2 μm and aspect ratio of as high as at least 30 was 75%. The needle-like particles were calcined at 500° C. in air for 1 h and then fired at 800° C. for 1 h while N₂ gas containing CO gas was introduced thereinto to form electroconductive zinc oxide which kept the shape of the particles.

EXAMPLE 11

61 g (0.75 mol) of zinc oxide (No. 1 zinc white produced by Sakai Chemical Industry Co., Ltd.), 72 g (0.75 mol) of ammonium carbonate and 90 g (1.5 mol) of 29% aqueous ammonia were dissolved in water to form 500 ml of the solution. It had [NH₄]/[Zn] of 4.0, [CO₃]/[Zn] of 1.0 and pH of 11.1. Carbon dioxide was bubbled into the solution to form a precipitate. Before and after the beginning of the precipitate formation, a solution of 9.5 g (0.015 mol) of aluminum sulfate 14- to 18-hydrate in 200 ml of water was added thereto to examine the influence of the time of adding Al on the shape of the precipitate thus formed. The introduction of CO₂ gas was terminated at pH 8.4 and the resultant precipitate was taken by filtration, washed with methanol and dried at 105° C. overnight. Each of the resultant powder had an aspect ratio distribution. Either comprised over eighty % of the particles having a length of 5 to 100 μm, thickness of 0.05 to 6 μm and aspect ratio of at least 10. But the amount of the particles having a length of 20 to 80 μm, thickness of 0.05 to 2 μm and aspect ratio of at least 30 varied depending on the time of the addition of Al. Namely, it was 75% in case Al was added before the formation of the precipitate, such a large quantity indicating that most of the particles were those having a high aspect ratio. It was 50% in case Al was added after the formation of the precipitate, such a small quantity indicating that most of the particles had an aspect ratio of around 10. These needle-like particles were fired at 800° C. for 1 h while $N_2$ gas containing CO gas was introduced thereinto. The needle-like shape of the particles was substantially unchanged.

EXAMPLE 12

61 g (0.75 mol) of zinc oxide (No. 1 zinc white produced by Sakai Chemical Industry Co., Ltd.), 59 g (0.75 mol) of ammonium hydrogencarbonate and 132 g (2.25 mol) of 29% aqueous ammonia were dissolved in water to form 500 ml of the solution. It had $[NH_4]/[Zn]$ of 4, $[CO_3]/[Zn]$ of 1 and pH of 11.4. A solution of 9.5 g (0.015 mol) of aluminum sulfate 14-to 18-hydrate in 200 ml of water was slowly added to this solution while carbon dioxide was bubbled thereinto until the reaction was terminated. When pH was lowered to 8.6, the introduction of carbon dioxide was terminated and a precipitate thus formed was taken by filtration. The precipitate was dried at 105° C. overnight without washing. It comprised over ninety % of the particles having a length of 5 to 100 μm, thickness of 0.05 to 6 μm and aspect ratio of at least 10. The quantity of the particles having a length of 40 to 80 μm, thickness of 2 to 6 μm and aspect ratio of 10 to 20 was as large as 85%. The particles had the uniform shape. The needle-like particles were fired at 800° C. for 1 h while $N_2$ gas containing $H_2$ gas was introduced thereinto. The needle-like shape of the particles was substantially unchanged.

COMPARATIVE EXAMPLE 1

41 g (0.5 mol) of zinc oxide (No. 1 zinc white produced by Sakai Chemical Industry Co., Ltd.) and 108 g (1.1 mol) of ammonium carbonate were dissolved in water to form 700 ml of the solution. It had $[NH_4]/[Zn]$ of 4.4, $[CO_3]/[Zn]$ of 2.2 and pH of 9.1. Carbon dioxide was bubbled into the solution to lower pH to 8.2. The precipitate thus formed was taken by filtration, washed with methanol and dried at 105° C. overnight.

The resulting product was aluminum-free needle-like particles having a length of 20 to 100 μm, thickness of 1 to 10 μm and aspect ratio of 5 to 15.

Figure 2:
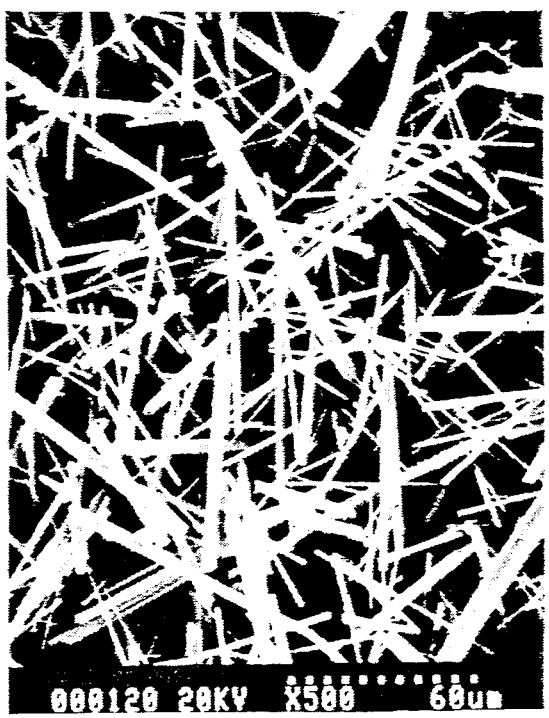
Figure 3:
FIG. 3 is an electron photomicrograph ($\times$500 magnification) showing the needle-like zinc carbonate of Comparative Example 1.

The electron micrographs (×500 magnification) of the needle-like zinc carbonate produced in Examples 8 and 9 and Comparative Example 1 are shown in FIGS. 1, 2 and 3, respectively. The electron micrographs were taken with a scanning electron microscope (S-520 produced by Hitachi, Ltd.) under accelerating voltage of 20 kV, It is apparent from the Figures that the crystals having a high aspect ratio can be obtained by using aluminum.

EXAMPLE 13

0.2 mol of zinc chloride, 0.1 mol of hydrochloric acid and 0.4 mol of hexamethylenetetramine were dissolved in 10 l of water, the solution was heated at 95° C. and the reaction was conducted for 2 h. The resultant white precipitate was taken by filtration and dried to obtain a powder comprising needle-like crystals of ZnO having an average length of 10 μm, average thickness of 0.5 μm and aspect ratio of 20.

10 g of the needle-like ZnO powder was dispersed in 20 ml of water. 53 g of 5.7 wt. % aqueous ammonium carbonate solution and 5.5 g of 4.9 wt. % aqueous aluminum sulfate solution were added to the dispersion and they were stirred at 60° C. for 30 min and filtered. The product thus obtained was dried.

The dried powder was fired at 800° C. in $N_2$ gas containing CO for 1 h to form a slightly grayish white powder. The needle-like shape of the particles was substantially unchanged even after the firing. The powder had a volume resistivity of 85 Ωcm and aspect ratio of 20.

The Al content determined according to fluorescent X-ray spectroscopy was 0.012 mol per mol of Zn atom.

EXAMPLE 14

161 g of zinc sulfate and 180 g of urea were dissolved in 1 l of water. The solution was added dropwise to 1 l of water heated to 100° C.

After completion of the addition, the white precipitate thus formed was taken by filtration and dried to obtain a powder of platy particles of basic zinc sulfate having an average length of 30 μm, thickness of 1 μm and length/thickness ratio of 30.

A solution of 0.43 g of aluminum nitrate in a small quantity of water was added to 11.9 g of the platy particles of basic zinc sulfate. The mixture was dried and fired at 900° C. in $N_2$ gas containing CO for 1 h to form zinc oxide which was in the form of a slightly yellowish white powder. The platy shape of the particles was substantially unchanged (length/thickness ratio=35).

The powder had a volume resistivity of 830 Ωcm.

The Al content determined according to fluorescent X-ray spectroscopy was 0.02 mol per mol of Zn atom.

EXAMPLE 15

An aqueous dispersion of 1.3 g of germanium oxide was mixed in 100 g of zinc oxide (a product of Matsushita Sangyo Kiki Co.) in the form of tetrapod-shaped particles having a length and thickness of each pod of 20 μm and 2 μm, respectively, and aspect ratio of 10. After drying, the mixture was fired at 800° C. in $N_2$ gas containing CO for 1 h.

After completion of the firing, the tetrapod-shaped particles were examined to reveal that although they were partially broken into needle-like particles, the original shape of them was substantially kept (aspect ratio: 10). The powder was white.

The powder had a volume resistivity of 250 Ωcm.

The Ge content determined according to fluorescent X-ray spectroscopy was 0.009 mol per mol of Zn atom.

EXAMPLE 16

Electroconductive zinc oxide was synthesized in the same manner as that of Example 15 except that germanium oxide was replaced with a given amount of gallium oxide, indium oxide or stannic oxide. The volume resistivity and color of the resultant powder are shown in Table 4.

TABLE 4

| | Amount (g) | Volume resistivity (Ω cm) | Color | Aspect Ratio |
|---|---|---|---|---|
| $Ga_2O_3$ | 3.2 | $1.8 \times 10^2$ | Slightly bluish gray | 10 |
| $In_2O_3$ | 2.8 | $6.9 \times 10^3$ | Light gray | 10 |
| $SnO_2$ | 1.9 | $9.0 \times 10^3$ | Light brown | 10 |

EXAMPLE 17

100 parts by weight of a high-density polyethylene resin (UF-640 produced by Idemitsu Sekiyu Kagaku Co.) was kneaded together with the needle-like or platy electroconductive zinc oxide synthesized in Examples 13-15 in a weight ratio shown in Table 5 with a Banbury mixer and press-molded into resin plates. The volume resistivity ($\Omega$cm) of each molding was determined by a method of SE IS-2301 to obtain the results shown in Table 5.

TABLE 5

| Electroconductive material | Volume resistivity of powder ($\Omega$ cm) | Parts by weight of powder | | | Color or resin plate |
| --- | --- | --- | --- | --- | --- |
| | | 70 | 100 | 150 | |
| Needle-like ZnO of Example 13 | 85 | $8 \times 10^5$ | $5 \times 10^4$ | $8 \times 10^3$ | Light gray |
| Platy ZnO of Example 14 | 830 | $4 \times 10^6$ | $1 \times 10^5$ | $5 \times 10^4$ | Light yellow |
| Tetrapod-shaped ZnO of Example 15 | 250 | $2 \times 10^5$ | $2 \times 10^4$ | $6 \times 10^3$ | White |

EXAMPLE 18

100 parts by weight of an acrylic resin paint (A-136-55 produced by Dainippon Ink & Chemicals, Inc.) and the needle-like or platy electroconductive zinc oxide synthesized in Examples 13-15 were dispersed in toluene in a weight ratio shown in Table 6 and they were kneaded with a triple roll mill. It was applied to a PET film with a doctor blade 100 $\mu$m) to form a coating film, which was dried overnight and the surface resistivity ($\Omega$) thereof was determined according to a method of ASTM D-257. The results are shown in Table 6.

TABLE 6

| Electroconductive material | Volume resistivity of powder ($\Omega$ cm) | Parts by weight of powder | | | Color of coating film |
| --- | --- | --- | --- | --- | --- |
| | | 70 | 100 | 150 | |
| Needle-like ZnO of Example 13 | 85 | $9 \times 10^6$ | $1 \times 10^6$ | $8 \times 10^5$ | Light gray |
| Platy ZnO of Example 14 | 830 | $2 \times 10^7$ | $6 \times 10^6$ | $3 \times 10^6$ | Light yellow |
| Tetrapod-shaped ZnO of Example 15 | 250 | $8 \times 10^6$ | $2 \times 10^6$ | $1 \times 10^6$ | White |

What is claimed is:

1. A needle shaped monoammine complex of zinc carbonate having an average length of 5 to 100 $\mu$m, average thickness of 0.05 to 10 $\mu$m and aspect ratio of at least 3.

2. The needle shaped monoammine complex of zinc carbonate of claim 1, wherein the aspect ratio is in the range of 5 to 100.

3. A process for producing a needle shaped monoammine complex of zinc carbonate comprising steps of (a) dissolving a zinc compound in a solution containing 3 to 7 mol of ammonium ion and 0.5 to 4 mol of carbonate ion and/or hydrogencarbonate ion per mol of zinc atom and then (b) adjusting pH of the solution resulting from step (a) to a range of 7–9.5 to precipitate a needle shaped monoammine complex of zinc carbonate having an aspect ratio of at least 3.

4. The process of claim 3, wherein a molar ratio of NH$_4$ ion to Zn ion in the solution is in the range of 3/1 to 7/1.

5. The process of claim 3, wherein a molar ratio of CO$_3$ ion to Zn ion in the solution is in the range of 0.5/1 to 4/1.

6. The process of claim 3, wherein a concentration of Zn ion in the solution is 0.1 to 3 mol/l.

7. The process of claim 3, wherein a molar ratio of NH$_4$ ion to CO$_3$ ion in the solution is in the range of 1.5/1 to 4.2/1.

8. The process of claim 3, wherein steps (a) and (b) are performed at a temperature at which ammonium ion in the solution is not released in the form of ammonia.

9. The process of claim 3, wherein the solution resulting from step (a) has a pH of 8.5 to 12 and step (b) is performed by adding carbon dioxide, a mineral acid or an organic acid to the solution resulting from step (a) and lowering the pH to a range of 7 to 9.5.

10. A needle shaped monoammine complex of zinc carbonate having an average length of 10 to 100 $\mu$m, average thickness of 0.5 to 10 $\mu$m and aspect ratio of at least 3.

11. The needle shaped monoammine complex of zinc carbonate of claim 10, wherein the aspect ratio is in the range of 5 to 100.

12. A process for producing a needle shaped monoammine complex of zinc carbonate comprising the steps of (a) dissolving a zinc compound in a solution containing 3 to 7 mol of ammonium ion and 0.5 to 4 mol of carbonate ion and/or hydrogencarbonate ion per mol of zinc atom and then (b) lowering pH of the solution to adjust pH thereof to a range of 7–9.5 so as to precipitate a needle shaped monoammine complex of zinc carbonate therefrom, the needle shaped monoammine complex of zinc carbonate having an average length of 10 to 100 $\mu$m, average thickness of 0.5 to 10 $\mu$m and aspect ratio of at least 3.

13. The process of claim 12, wherein the solution resulting from step (a) has a pH of 8.5 to 12 and step (b) is performed by adding carbon dioxide, a mineral acid or an organic acid to the solution resulting from step (a) and lowering the pH to a range of 7 to 9.5.

14. The process of claim 12, wherein steps (a) and (b) are performed at a temperature at which ammonium ion in the solution is not released in the form of ammonia.

* * * * *

UNITED STATES PATENT AND TRADEMARK OFFICE
CERTIFICATE OF CORRECTION

PATENT NO. : 5,132,104

DATED : July 21, 1992

INVENTOR(S) : Nobuyuki YAMAMOTO ET AL

It is certified that error appears in the above-identified patent and that said Letters Patent is hereby corrected as shown below:

On the title page,

In Section [30], delete "Jul. 21, 1989" and insert -- Jul. 28, 1989 --; delete "Oct. 31, 1989" and insert -- Aug. 31, 1989 --; and delete "Dec. 17, 1989" and insert -- Dec. 7, 1989 --.

Signed and Sealed this

Fourteenth Day of September, 1993

Attest:

BRUCE LEHMAN

Attesting Officer — Commissioner of Patents and Trademarks